US010492367B2

(12) United States Patent
Byttebier et al.

(10) Patent No.: US 10,492,367 B2
(45) Date of Patent: Dec. 3, 2019

(54) UNLOADING SYSTEM FOR AGRICULTURAL HARVESTING MACHINE

(71) Applicant: CNH Industrial America LLC, New Holland, PA (US)

(72) Inventors: Ward M. R. Byttebier, Zwevegem (BE); Bernard E. D. Depestel, Beernem (BE); Karel M. C. Viaene, Moorslede (BE); Pieter Vanysacker, Moere (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/915,852

(22) PCT Filed: Sep. 3, 2014

(86) PCT No.: PCT/EP2014/068724
§ 371 (c)(1),
(2) Date: Mar. 1, 2016

(87) PCT Pub. No.: WO2015/032809
PCT Pub. Date: Mar. 12, 2015

(65) Prior Publication Data
US 2016/0192590 A1    Jul. 7, 2016

(30) Foreign Application Priority Data
Sep. 3, 2013  (BE) .................................. 2013/0571

(51) Int. Cl.
*A01D 90/10*      (2006.01)
*A01D 43/08*      (2006.01)
*A01D 41/127*     (2006.01)

(52) U.S. Cl.
CPC ......... *A01D 90/10* (2013.01); *A01D 41/1272* (2013.01); *A01D 43/085* (2013.01); *A01D 43/087* (2013.01)

(58) Field of Classification Search
None
See application file for complete search history.

(56) References Cited

U.S. PATENT DOCUMENTS

| 4,441,846 | A  | 4/1984  | Johnson |
| 4,573,849 | A  | 3/1986  | Johnson et al. |
| 6,943,824 | B2 | 9/2005  | Alexia et al. |
| 8,682,540 | B2 | 3/2014  | Missotten et al. |
| 8,868,304 | B2 | 10/2014 | Bonefas |

(Continued)

FOREIGN PATENT DOCUMENTS

DE    102011005400 A1    9/2012

*Primary Examiner* — Jonathan M Dager
*Assistant Examiner* — Garrett F Evans
(74) *Attorney, Agent, or Firm* — Patrick M. Sheldrake; Peter K. Zacharias

(57) ABSTRACT

An unloading apparatus is arranged to direct material to a container. A controller determines a build-up speed of the material in the container; in accordance with the determined build-up speed, determine a rate of change to be applied when setting an attribute of at least one of the unloading apparatus and container; and set an attribute of at least one of the unloading apparatus and container in accordance with the determined rate of change in order to direct the material from the unloading apparatus to the container.

13 Claims, 2 Drawing Sheets

(56) References Cited

U.S. PATENT DOCUMENTS

| | | | |
|---|---|---|---|
| 2003/0019196 A1* | 1/2003 | Coers | A01D 41/127 56/10.2 G |
| 2012/0200697 A1* | 8/2012 | Wuestefeld | G01F 1/00 348/137 |
| 2012/0263560 A1 | 10/2012 | Diekhans et al. | |
| 2013/0213518 A1* | 8/2013 | Bonefas | A01D 43/073 141/1 |
| 2014/0350801 A1 | 11/2014 | Bonefas | |

* cited by examiner

UNLOADING SYSTEM FOR AGRICULTURAL HARVESTING MACHINE

This application is the US National Stage filing of International Application Serial No. PCT/EP2014/068724 filed on Sep. 3, 2014 which claims priority to Belgian Application BE2013/0571 filed Sep. 3, 2013, each of which is incorporated herein by reference in its entirety.

FIELD OF THE INVENTION

The present disclosure relates to agricultural harvesting machines such as forage harvesters and combine harvesters, and in particular to controllers for movable unloading apparatus of agricultural harvesting machines.

BACKGROUND OF THE INVENTION

In forage harvesters of the above type, control of the spout position and of the position of a pivotable end portion (flap) of the spout on the basis of camera images is known in the art. Patent publication WO-A-2011101458 describes a system in which a 3D camera 15 is arranged on the discharge spout. The camera takes images of the container driving next to the machine. These images define at least two vertical strips. Analysis of these strips provides the position of the front and/or rear wall of the container relative to the camera. Based on this information, the spout is controlled so that the crop material is unloaded in the container.

SUMMARY OF THE INVENTION

According to a first aspect of the invention, there is provided a controller for an unloading system, the unloading system comprising an unloading apparatus and a container that are movable relative to each other, wherein the unloading apparatus is configured to direct material to the container, and wherein the controller is configured to:
  determine a build-up speed of the material in the container;
  in accordance with the determined build-up speed, determine a rate of change to be applied when setting an attribute of the unloading apparatus and/or container; and
  set an attribute of the unloading apparatus and/or container in accordance with the determined rate of change in order to direct the material from the unloading apparatus to the container.

In this way, the unloading system can be automatically controlled such that its attributes can be changed at a rate that is tailored to the speed with which material is building up in the container. This can reduce spillage of the material from the container.

The controller may be configured to process one or more of the following in order to determine the build-up speed of the material in the container:
  a material setting indicative of the type of material that is being unloaded;
  a horsepower of an engine associated with the unloading apparatus multiplied by engine load;
  a measurement of fuel consumption of an engine associated with the unloading apparatus;
  a flow sensor signal;
  a travelling speed of a vehicle associated with the unloading apparatus; and
  images of the material in the container.

The controller may be configured to determine a value for the build-up speed of the material in accordance with one or more measured parameters, and wherein the controller is configured to determine the rate of change in accordance with the determined value for the build-up speed.

The controller may be configured to determine the value for the build-up speed of the material in accordance with an algorithm.

The controller may be configured to apply a material build-up control algorithm in order to determine the rate of change in accordance with the determined build-up speed. The controller may be configured to use a look-up table or database in order to determine the rate of change in accordance with the determined build-up speed.

The controller may be for a movable unloading apparatus of an agricultural harvesting machine. The controller may be configured to determine a rate of change to be applied when setting an attribute of the unloading apparatus.

The attribute of the unloading apparatus may comprise one or more of an angular position of the unloading apparatus about a vertical axis, an angular position of the unloading apparatus about a horizontal axis and an angular position of a pivotable flap at a distal end of the unloading apparatus.

There may be provided an agricultural harvesting machine comprising:
  a moveable unloading apparatus, and
  any controller disclosed herein.

According to a further aspect of the invention, there is provided a method of controlling an unloading system to direct material from an unloading apparatus to a container, wherein the unloading apparatus and container are movable relative to each other, the method comprising:
  determining a build-up speed of the material in the container;
  in accordance with the determined build-up speed, determining a rate of change to be applied when setting an attribute of the unloading apparatus and/or container; and
  setting an attribute of the unloading apparatus and/or container in accordance with the determined rate of change in order to direct the material from the unloading apparatus to the container.

The step of determining a build-up speed of the material in the container may comprise one or more of the following steps:
  processing a material setting indicative of the type of material that is being unloaded;
  processing a horsepower of an engine associated with the unloading apparatus multiplied by engine load;
  processing a measurement of fuel consumption of an engine associated with the unloading apparatus;
  processing a flow sensor signal;
  processing a travelling speed of a vehicle associated with the unloading apparatus; and
  processing images of the material in the container.

The method may comprise determining a value for the build-up speed of the material in accordance with one or more measured parameters. The step of determining the rate of change may be in accordance with the determined value for the build-up speed. The method may comprise determining the value for the build-up speed of the material in accordance with an algorithm, The method may comprise applying a material build-up control algorithm and/or using a look-up table or database in order to determine the rate of change in accordance with the determined build-up speed.

The method may be for controlling a movable unloading apparatus of an agricultural harvesting machine. The method may comprise determining a rate of change to be applied when setting an attribute of the unloading apparatus.

There may be provided a controller for a movable unloading apparatus of an agricultural harvesting machine, wherein the movable unloading apparatus is configured to direct crop material from the agricultural harvesting machine to a container driven in the vicinity of the agricultural harvesting machine, and wherein the controller is configured to:

determine a build-up speed of the crop in the container;

in accordance with the determined build-up speed, determine a rate of change to be applied when setting an attribute of the unloading apparatus; and optionally, set an attribute of the unloading apparatus in accordance with the determined rate of change in order to direct the crop material from the unloading apparatus to the container.

There may be provided a method of controlling a movable unloading apparatus of an agricultural harvesting machine to direct crop material from the agricultural harvesting machine to a container driven in the vicinity of the agricultural harvesting machine, the method comprising the steps of:

determining a build-up speed of the crop in the container;

in accordance with the determined build-up speed, determining a rate of change to be applied when setting an attribute of the unloading apparatus; and optionally, setting an attribute of the unloading apparatus in accordance with the determined rate of change in order to direct the crop material from the unloading apparatus to the container.

There may be provided a computer program, which when run on a computer, causes the computer to configure any apparatus, including a controller and agricultural harvesting machine disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF PREFERRED EMBODIMENTS

One or more embodiments disclosed herein relate to controller for an unloading system having an unloading apparatus for directing material into a container, wherein the unloading apparatus and container are movable relative to each other. The unloading apparatus may be a discharge spout of an agricultural harvesting machine such as a forage harvester or a combine harvester. The controller can determine a build-up speed of the material in the container and then, in accordance with the determined build-up speed, determine a rate of change to be applied when setting an attribute of the unloading apparatus and/or container. For example, the attribute could be the angular position of the discharge spout about a vertical axis, and the rate at which this angular position can be changed is set in accordance with the determined build-up speed. Alternatively or additionally, the attribute may be the speed of the container relative to the discharge spout. In this way, the likelihood of crop building up in the container to such an extent that it spills over the side of the container can be reduced.

In this way, the unloading system can be automatically controlled such that its attributes can be changed at a rate that is tailored to the speed with which material is building up in the container. This can reduce spillage of the material from the container.

Figure 1:
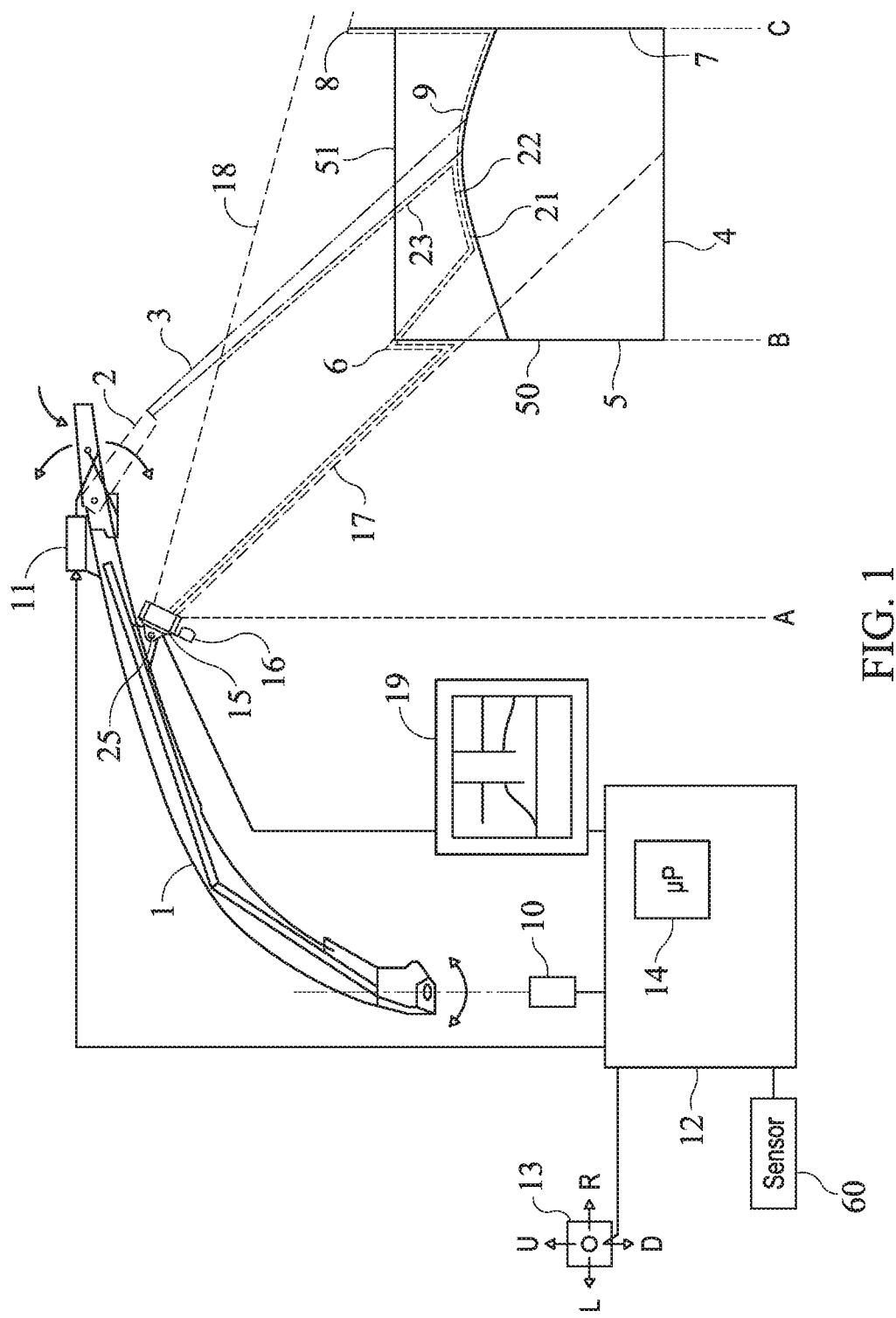
FIG. 1 shows a schematic image of a discharge spout of an agricultural harvesting machine.
Figure 2:
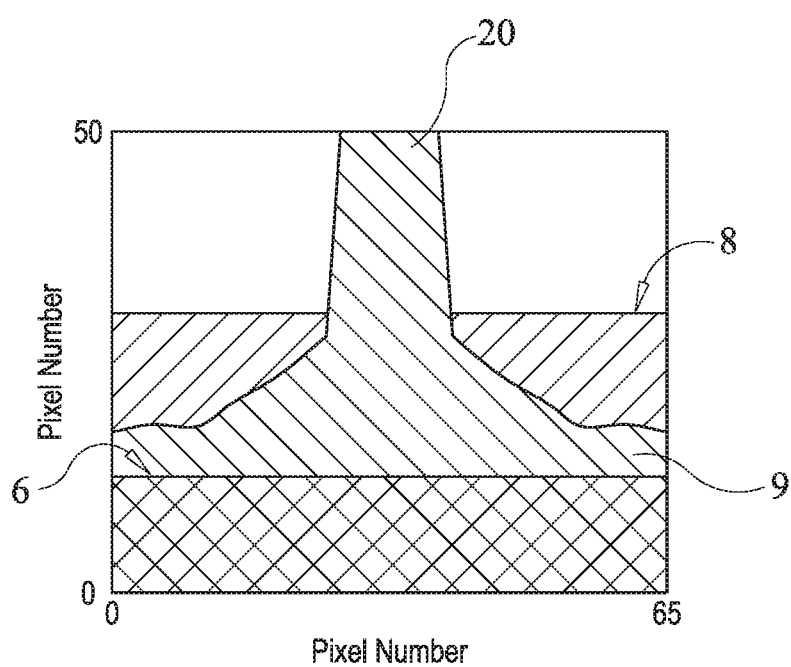
FIG. 2 shows an example of a simplified image 19 that can be taken by the camera of FIG. 1.

FIGS. 1 and 2 are examples of an unloading system in the agricultural industry, in which the material that is unloaded is a crop. It will be appreciated from the description that follows that examples disclosed herein can also be used in other industries, for example in construction.

FIG. 1 is a schematic image of a discharge spout 1, which is an example of a movable unloading apparatus. The base of the discharge spout 1 is mounted for rotation about a vertical axis and pivoting about a horizontal axis on an agricultural harvesting machine (not shown), in a manner known in the art. The agricultural harvesting machine may be a forage harvester or a combine harvester. The discharge spout 1 is used to direct a stream 3 of processed crop material from the agricultural harvesting machine to a container 4. The container 4 and discharge spout 1 are movable relative to each other. In this example the container 4 is driven in the vicinity of the agricultural harvesting machine, for example it may be driven either behind or next to the agricultural harvesting machine.

The container 4 has a near wall 5, closest to the agricultural harvesting machine, and an opposite, remote wall 7. The near wall 5 has an upper border/edge 6 and the remote wall 7 also has an upper border/edge 8. Crop material is deposited into the container 4 from the discharge spout 1 and forms a heap 9 therein.

The base of the discharge spout 1 is equipped with an actuator, for example a hydraulic motor 10, for changing the angular position of the discharge spout 1 about the vertical axis. The discharge spout 1 is also equipped with a further actuator, for example a hydraulic cylinder (not shown), for changing the height of the distal end of the discharge spout 1 by controlling the angle of the discharge spout about the horizontal axis. The discharge spout 1 further has a pivotable flap 2 at its distal end, equipped with a third actuator, for example a linear electrical actuator 11, for changing the angle of the pivotable flap 2 about a horizontal axis. The three actuators are controlled by a controller 12 in order to direct the stream 3 of processed crop material into the container 4. The controller 12 may be governed by a manual control 13 or by a microprocessor 14 that implements any known control algorithm such as the one described in WO-A-2011/101458. Such manual control and known control algorithm will be referred to as a main control methodology.

The controller 12 can determine a build-up speed of the crop heap 9 in the container 4, examples of which are discussed below. The controller 12 can then automatically control the discharge spout 1 in accordance with the determined build-up speed in order to better direct the crop material 3 from the discharge spout 1 to the container 4. This control will be referred to as a crop build-up control methodology and can be used to supplement the main control methodology in order to reduce crop spillage. If the main control methodology is manual control then the crop build-up control methodology can implement user input instructions differently depending upon the determined crop build-up speed. Further details are provided below.

The build-up speed of crop in the container 4 can be determined using one or more of the following parameters:
1. A material setting, that may be set by a user, indicative of the type of material that is being unloaded. The material setting may be a crop setting and may be shown on a display in the cab of the agricultural harvesting machine. The crop setting may be indicative of the crop that is being harvested and may have a direct effect on how quickly the heap 9 builds up in the container 4. For example, a heap of grass is more likely to form a tower as it deposited in the container whereas a heap of corn is more likely to even itself out in the container as it can flow more easily. Therefore, a higher build-up speed may be associated with a crop setting of grass than a crop setting of corn.
2. The horsepower of an engine associated with the unloading apparatus 1 multiplied by engine load. In this example, the horsepower of the agricultural harvesting machine's engine is used. Such information can be available to the controller 12 from a computer associated with the vehicle/forage harvester. The agricultural harvesting machine's engine load and horsepower can be used to determine how much work the agricultural harvesting machine is doing, which is indicative of the amount of crop that is being harvested and therefore also how quickly crop is building up in the heap 9. A higher value for the multiple of the horsepower of the engine and engine load can be associated with a higher build-up speed.
3. A measurement of the fuel consumption of an engine associated with the unloading apparatus 1. In this example, the fuel consumption of the agricultural harvesting machine is used. Again, such information can also be available from a computer associated with the vehicle/agricultural harvesting machine. As with 2. above, the fuel consumption of the agricultural harvesting machine can also be indicative of how quickly crop is building up in the heap 9. Therefore, a higher value for the fuel consumption can be associated with a higher build-up speed.
4. A flow sensor signal. A flow sensor can estimate the capacity (in tons/hour for example) based on the size of the opening of feeding rolls of the harvesting machine in combination with the rotational speed of the feeding rolls. Alternatively or additionally the flow sensor can measure the amount of material in front of the harvester, before it is handled by the feeding rollers. Such a flow sensor can be used for swath guidance, and may be a camera, laser scanner, ultrasonic sensor, or a 3D camera, as non-limiting examples. A higher flow can be associated with a higher build-up speed.
5. A "header usage" parameter, indicative of a proportion of an agricultural harvesting machine's header that is in use for gathering crop. For example a corn header can have 20 rows. In some situations not all of the rows are required. The operator of the agricultural harvesting machine can therefore adjust at any given time how many rows are in use, thereby setting the "header usage" parameter. This parameter is indicative of the amount of material entering the machine and therefore can be used to determine the build-up speed of crop. A higher "header usage" parameter can be associated with a higher build-up speed.
6. The travelling speed of a vehicle associated with the unloading apparatus 1, which in this example is the agricultural harvesting machine. A heap will build up slower when the agricultural harvesting machine is driving at 3 km/h than for the agricultural harvesting machine driving at 7 km/h. A higher value for the travelling speed can be associated with a higher build-up speed. The speed of the agricultural harvesting machine may be used in combination with the horsepower of the agricultural harvesting machine's engine and/or the "header usage" parameter.
7. Image data of the material, optionally image data of the material in the container 4, as discussed in more detail below. The build-up speed may also be calculated by processing camera/sensor data in order to track changes in the heap size.

Some of the above parameters can be measured by a sensor 60, which is shown schematically in FIG. 1 as coupled to the controller 12. The sensor 60 can be part of an on-board diagnostics (OBD) system associated with the forage harvester.

The controller 12 of FIG. 1 can apply an algorithm to one or more of the above parameters in order to determine a value for the build-up speed of the crop. At least some of the above parameters are examples of measured parameters. This value can then be used to determine the rate of change to be applied when setting an attribute of the unloading apparatus and/or container. The value may for example be a numerical value in a range between maximum and minimum values, for example on a scale of 1 to 10. The algorithm can apply a weighting to one or more of the parameters such that they have a greater influence on the determined build-up speed value. Alternatively, the controller 12 may use a database or look-up table to convert one or more of the above parameters into a value for the build-up speed.

The controller 12 of FIG. 1 can use the determined build-up speed to control the discharge spout in order to direct the crop material from the discharge spout to the container. The rate of change of one or more of the following attributes of the discharge spout 1 can be set by the crop build-up control methodology:
1. the angular position of the discharge spout about a vertical axis, for example by controlling the hydraulic motor 10. This may be referred to as spout rotation;
2. the angular position of the discharge spout about a horizontal axis, for example by controlling the hydraulic cylinder (not shown). This may be referred to as spout elevation; and
3. the angular position of the pivotable flap 2, for example by controlling the linear electrical actuator 11. This may be referred to as flipper angle.

Additionally or alternatively, the absolute values of the above attributes (and not necessarily the rate of change) can be set by the crop build-up control methodology.

The crop build-up control methodology may determine a multiplier for the speed with which one or more of the above attributes is changed, wherein the multiplier is set in accordance with the determined build-up speed. Use of a multiplier can allow more tailored control of the discharge spout based on its current use such that crop can be more accurately directed to the container, thereby reducing crop waste. This may be referred to as changing a gain of one or more control loops in the controller 12, wherein the control loops are used by the main control methodology.

In one example, the crop build-up control methodology may set the speed with which the discharge spout 1 can rotate about its vertical axis. This may be referred to as setting a gain for the global spout rotation flow. For a high value of the determined build-up speed, the discharge spout 1 can be controlled such that it rotates more quickly than for slower build-up speeds. This is on the basis that the discharge spout 1 should react more quickly for a heap that builds up quickly as any delay can increase the likelihood that crop will spill out of the container 4.

In one example, the crop build-up control methodology may be a crop build-up control algorithm that uses the determined build-up speed to calculate a multiplier (also referred to as a gain value) for the speed with which the discharge spout 1 will be rotated. The crop build-up control algorithm may or may not apply a linear function. The main control methodology may provide a main control signal to rotate the discharge spout 1 by a predetermined amount. The main control signal may be automatically generated by a main control algorithm or may be responsive to user input. The crop build-up control algorithm can control how quickly the discharge spout is rotated by the predetermined amount.

Alternatively, a database or look-up table can be used by the crop build-up control methodology to determine a required rotational speed of the discharge spout 1 for a given build-up speed.

Optionally, a 3-D camera 15 and a light source 16 are mounted on the discharge spout 1, below the pivotable flap 2 as shown in FIG. 1. The camera 15 is configured to produce images 19 as arrays of pixels, and to provide depth data representative of the distance between the camera and objects shown in the image, for each pixel in the image. This depth data may be determined on the basis of the well-known time-of-flight principle. The field of the camera is represented in FIG. 1 by the border lines 17 and 18. The light source 16 is preferably a Near Infra Red (NIR) lamp, which emits modulated light with a certain wavelength. Reflected light of the same wavelength is captured by the camera 15.

The camera 15 is positioned such that it records images 19 that include a stream of crop material 3 as it passes from the discharge spout 1 to the container 4. The camera 15 can also record images of the crop heap 9 that builds up in the container 4.

FIG. 2 shows an example of a simplified image 19 that can be taken by the camera of FIG. 1. Different shading patterns are used to represent different distances from the camera. The upper border 6 of the near wall is represented in the lower portion of the image 19, while the upper border 8 of the remote wall is represented in the upper portion of the image 19. FIG. 2 shows the crop stream 20 as it passes into the container, and the heap 9 of crop that is building up in the container.

The build-up speed of the heap 9 can also be determined by processing images obtained by the camera 15. This can involve determining a "filling degree measure" representative of the crop level within the container. For example, determination of the relative spacing between the crop within the container and the upper edges 6, 8 of the near and remote container walls can provide the "filling degree measure". One example of how to determine the crop level is described in WO2011/101458, the contents of which are incorporated herein by reference. The "filling degree measure" can then be differentiated with respect to time, such that the differential of the filling degree measure can be used as an indicator of heap 9 build-up.

In some examples, only values that are recorded when the discharge spout is not rotating and when the container 4 is not moving relative to the agricultural harvesting machine can be used for determining the build-up speed. In this way, a more accurate determination of crop build-up can be made. The speed of the agricultural harvesting machine relative to the container 4 can be determined in any way known in the art, which may include image processing successive camera images.

It will be appreciated that the image data may be representative of a 1-dimensional, 2-dimensional or 3-dimensional image. For example, the build-up speed can be determined by processing 1-dimensional image data that is provided by a 1-D distance sensor mounted on the discharge spout, for example near the end flap, that is aimed towards the heap of material in the trailer, directly under the end flap. In this way the height of the heap can be measured in time and a build-up speed can be derived.

In the above examples, the unloading apparatus is movable such that an attribute of the unloading apparatus can be set in order to direct the crop from the unloading apparatus to the container. It will be appreciated that alternatively or additionally, an attribute of the container can be set in a similar way in order to direct the crop from the unloading apparatus to the container. Such an attribute may be the speed of the container, in some examples the speed of the container relative to the unloading apparatus. In such examples, the unloading apparatus may be fixed, that is, not movable.

Also, the harvesting machine does not necessarily need to be moving whilst crop is being unloaded to the container. For example, a combine harvester may have a buffer for storing crop. The buffer can be unloaded whilst the combine harvester is standing still. In such examples, attributes of a discharge spout on the combine harvester and/or attributes of the container can be set during unloading, even though the combine harvester is not being driven.

The skilled person will also appreciate that one or more of the examples disclosed herein are equally applicable to the construction industry and other industries that have unloading systems. For example, unloading systems for transferring sand, cement and aggregate can be used in a similar way to the examples described above.

The invention claimed is:

1. An unloading system comprising
   an unloading apparatus configured to direct material to a container that is movable relative to the unloading apparatus, and
   a controller configured to:
      determine a build-up speed of the material in the container;
      in accordance with the determined build-up speed, determine a rate of change to be applied when setting an attribute of at least one of the unloading apparatus and the container; and
      set an attribute of at least one of the unloading apparatus container in accordance with the determined rate of change in order to direct the material from the unloading apparatus to the container; and
   wherein the controller is further configured to process a horsepower of an engine associated with the unloading apparatus multiplied by engine load in order to determine the build-up speed of the material in the container.

2. The unloading system of claim 1, wherein the controller is further configured to process a material setting indicative of the type of material that is being unloaded in order to determine the build-up speed of the material in the container.

3. The unloading system of claim 1, wherein the controller is further configured to process a flow sensor signal in order to determine the build-up speed of the material in the container.

4. The unloading system of claim 1, wherein the controller is further configured to process a travelling speed of a vehicle associated with the unloading apparatus in order to determine the build-up speed of the material in the container.

5. The unloading system of claim 1, wherein the controller is further configured to process images of the material in the container in order to determine the build-up speed of the material in the container.

6. The unloading system of claim 1, wherein the controller is further configured to determine a value for the build-up speed of the material in accordance with one or more measured parameters, and wherein the controller is configured to determine the rate of change in accordance with the determined value for the build-up speed.

7. The unloading system of claim 6, wherein the controller is further configured to determine the value for the build-up speed of the material in accordance with an algorithm.

8. The unloading system of claim 1, wherein the controller is configured to apply a material build-up control algorithm in order to determine the rate of change in accordance with the determined build-up speed.

9. The unloading system of claim 1, wherein the controller is configured to use a look-up table or database in order to determine the rate of change in accordance with the determined build-up speed.

10. The unloading system of claim 1, wherein the controller is operatively connected to the movable unloading apparatus of an agricultural harvesting machine, and the controller is configured to determine a rate of change to be applied when setting an attribute of the unloading apparatus.

11. An unloading system comprising
an unloading apparatus configured to direct material to a container that is movable relative to the unloading apparatus, and
a controller configured to:
determine a build-up speed of the material in the container;
in accordance with the determined build-up speed, determine a rate of change to be applied when setting an attribute of at least one of the unloading apparatus and the container; and
set an attribute of at least one of the unloading apparatus and container in accordance with the determined rate of change in order to direct the material from the unloading apparatus to the container;
wherein the controller is further configured to process a measurement of fuel consumption of an engine associated with the unloading apparatus in order to determine the build-up speed of the material in the container.

12. An agricultural harvesting machine having a harvesting header and unloading system comprising:

an unloading apparatus connected to a frame of the harvester, the unloading apparatus configured to direct material to a container that is movable relative to the unloading apparatus, and
a controller configured to:
determine a build-up speed of the material in the container;
in accordance with the determined build-up speed, determine an adjustment to be applied when setting an attribute of at least one of the unloading apparatus and the container;
set an attribute of at least one of a position of a portion the unloading apparatus with respect to the frame and container in accordance with the determined build-up speed in order to direct the material from the unloading apparatus to the container; and
wherein the build up speed of the material in the container is determined using a header usage parameter, wherein the header usage parameter is indicative of the amount of material entering the harvester and wherein the controller is further configured to process at least one of a horsepower of an engine associated with the unloading apparatus multiplied by engine load and a measurement of fuel consumption of said engine in order to determine the build-up speed of material in the container.

13. A method of controlling an unloading system to direct material from an unloading apparatus associated with an engine to a container, wherein the unloading apparatus and container are movable relative to each other, the method comprising:
determining, using a controller, a build-up speed of the material in the container;
in accordance with the determined build-up speed, determining a rate of change to be applied when setting an attribute related to controlling an angular position of the unloading apparatus; and
setting the attribute with the controller of the angular position of the unloading apparatus in accordance with the determined rate of change in order to direct the material from the unloading apparatus to the container; and
determining at least one of the horsepower multiplied by engine load of the engine and fuel consumption of the engine to determine the build-up speed of material in the container.

* * * * *